Feb. 16, 1926.
1,573,520

J. C. McNAB

VALVE

Filed August 25, 1924

Inventor
John C. McNab

By Frank Keiper.

Attorney

Patented Feb. 16, 1926.

1,573,520

UNITED STATES PATENT OFFICE.

JOHN C. McNAB, OF ROCHESTER, NEW YORK.

VALVE.

Application filed August 25, 1924. Serial No. 733,979.

*To all whom it may concern:*

Be it known that I, JOHN C. MCNAB, a citizen of the United States, residing at Rochester, in the county of Monroe and State of New York, have invented certain new and useful Improvements in Valves, of which the following is a specification.

The object of this invention is to provide a new and improved form of valve for pumps.

Another object is to increase the clearance in the valve so as to facilitate the passage of water through it and to increase the efficiency with which the valve operates.

Another object of the invention is to improve the packing of the valve so that it will not leak.

These and other objects of the invention will be fully illustrated in the drawing, described in the specification and pointed out in the claims thereof.

In the drawings.

In the drawings like reference numerals indicate like parts.

Figure 1:
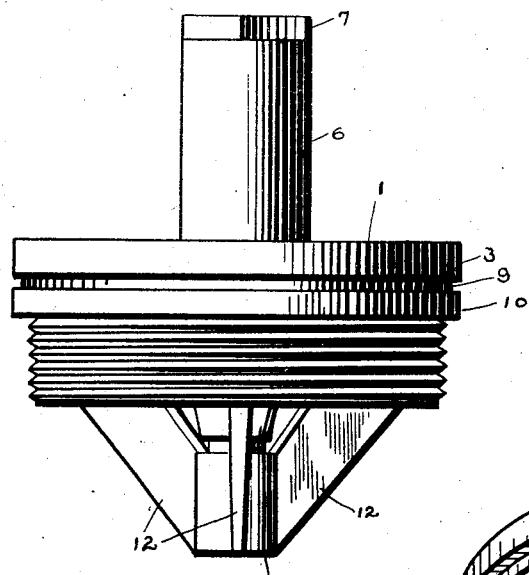
Figure 1 is a side elevation of the valve and valve seat.
Figure 2:
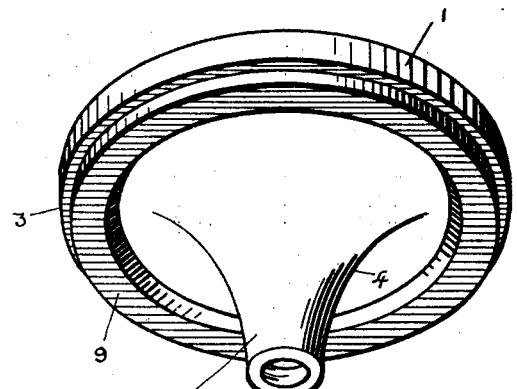
Figure 2 is a perspective view of the valve.
Figure 3:
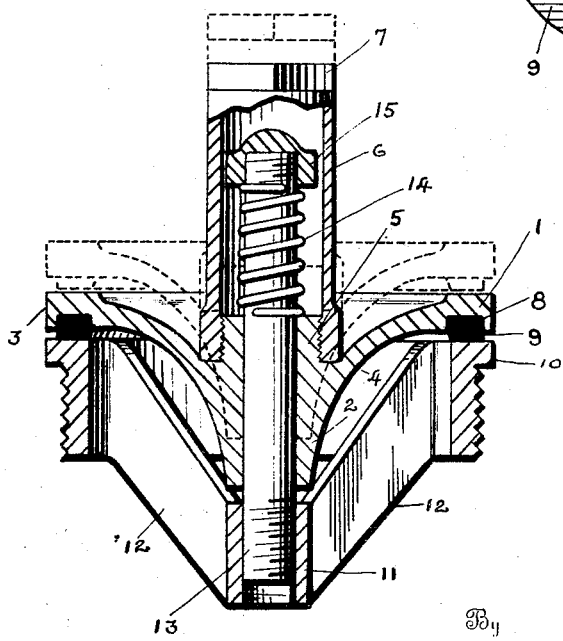
Figure 3 is a vertical section through the valve showing the assembly thereof.

In the drawing reference numeral 1 indicates the valve cover having a boss 2 thereon, a rim 3 and a curved web 4, having a conoidal shape. Centrally from the web extends up a nipple 5 which is threaded to receive the bonnet 6, which bonnet is provided with a square end 7 by which it may be turned with a wrench. The rim of the valve cover is grooved as is indicated at 8 to receive the annular packing 9.

10 indicates the annular valve seat having a hub 11 centrally thereof which is connected thereto by a spider of three arms 12—12—12. The hub 11 is threaded to receive the stem 13 which extends up through the boss 2 and nipple 5 and into the bonnet 6. On this stem is placed a helical spring 14 which is held in place on the stem by the nut 15, which is screwed down to put the desired pressure on the spring and cover.

The valve is assembled by screwing the valve stem into the hub. The cover is then placed on the stem and the spring and nut are also placed on the stem on top of the cover and the nut 15 is screwed down to give the desired pressure. The bonnet 6 is then screwed into place to close the opening between the valve cover and the stem.

The valve seat 10 is threaded so that it can be screwed into suitable openings provided in the valve deck of the pump. Ordinarily a series of these valves will be used on the suction side of the pump and another series of the valves will be used on the discharge side of the pump.

By placing the hub below the valve seat and inclining the arms that connect it to the seat the openings through which the water must pass are made considerably larger so that ample clearance is given for the passage of the water. By curving the web 4 the water is suitably deflected as it passes up through the valve so that it passes up and out of the valve with the least disturbance and resistance. By the use of the spring the valve is made quick acting and by the use of the bonnet all possibility of leakage or seepage is cut off and the valve can be made so that the fittings are loose enough so that the valve will move freely and will not bind.

I claim:

1. A valve having a seat, a hub located centrally thereof and below and out of line with the seat, inclined arms connecting said hub to said seat having openings between them, a valve stem threaded into said hub and extending upwardly therefrom, a cover for said valve having a conoidal web centrally thereof engaging with said stem and an annular groove near the rim thereof adapted to receive a packing which in turn is adapted to engage with said valve seat, said cover having a nipple integral therewith terminating below the top of the seat through which nipple the stem extends, a bonnet which encloses the valve stem with the cover, said bonnet making a threaded connection with said nipple thereby making a tight connection with said cover.

2. A valve having a seat, a hub located centrally thereof, a valve stem threaded into said hub and extending upwardly therefrom, a cover for said valve having a conoidal web making a sliding engagement with said stem, a nipple surrounding said stem forming a part of said cover and extending upwardly therefrom, a spring surrounding said stem and resting upon the nipple below, a head on top of said stem which confines said spring from above, a bonnet making threaded connection with said nipple and enclosing the spring and stem, said conoidal web extending down from the cover and below the valve seat and with the nipple making a long bearing with the stem.

In testimony whereof I affix my signature.

JOHN C. McNAB.